United States Patent [19]

Kobayashi et al.

[11] Patent Number: 4,762,644

[45] Date of Patent: Aug. 9, 1988

[54] ELECTROCONDUCTIVE POLYMER SOLUTION AND MANUFACTURE OF ELECTROCONDUCTIVE ARTICLE THEREFROM

[75] Inventors: Yukio Kobayashi, Sagamihara; Masataka Takeuchi, Kawasaki, both of Japan

[73] Assignee: Showa Denko Kabushiki Kaisha, Tokyo, Japan

[21] Appl. No.: 935,675

[22] PCT Filed: Mar. 7, 1986

[86] PCT No.: PCT/JP86/00120

§ 371 Date: Nov. 10, 1986

§ 102(e) Date: Nov. 10, 1986

[87] PCT Pub. No.: WO86/05194

PCT Pub. Date: Sep. 12, 1986

[30] Foreign Application Priority Data

Mar. 8, 1985 [JP] Japan ................... 60-44728
Mar. 8, 1985 [JP] Japan ................... 60-44729

[51] Int. Cl.⁴ .................... H01B 1/00; H01B 1/06
[52] U.S. Cl. .................... 252/500; 252/518; 524/80; 524/401; 524/404; 524/412; 524/408; 524/415; 524/422; 524/429; 524/423
[58] Field of Search ............... 252/500, 518; 528/422; 524/80, 401, 404, 412, 408, 415, 422, 429, 423

[56] References Cited

U.S. PATENT DOCUMENTS 4,025,463  5/1977  Frevoy ................. 252/62.30
4,025,691  5/1977  Frevoy ................. 252/501.4
4,582,587  4/1986  Hotta et al. ............ 252/518
4,599,194  7/1986  Frommer et al. ......... 252/518
4,615,829  10/1986  Tamura et al. ......... 252/518
4,617,143  10/1986  Kessmehl et al. ....... 252/518

*Primary Examiner*—Josephine Barr
*Attorney, Agent, or Firm*—Sughrue, Mion, Zinn, Macpeak & Seas

[57] ABSTRACT

A polymer solution comprising a polymer comprising at least 50 mole % of recurring units represented by the following formula (1):

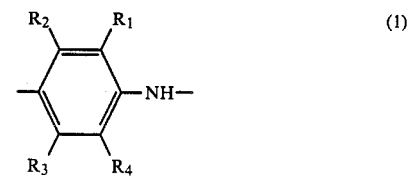

wherein $R_1$ through $R_4$, which may be the same or different, represent a hydrogen atom or an alkyl or alkoxy group having 1 to 5 carbon atoms, with the proviso that the case where all of $R_1$ through $R_4$ represent a hydrogen atom is excluded, a dopant and an organic solvent has a high electric conductivity and is valuable as an electrolyte of a battery, an electrolyte of a capacitor, and the like. A shaped article obtained by shaping this solution and removing the organic solvent from the shaped article has a high electric conductivity and is valuable as various electronic parts.

22 Claims, No Drawings

ELECTROCONDUCTIVE POLYMER SOLUTION AND MANUFACTURE OF ELECTROCONDUCTIVE ARTICLE THEREFROM

DESCRIPTION

1. Technical Field

The present invention relates to a solution of an electroconductive polymer. More particularly, the present invention relates to an electroconductive polymer solution comprising a specific oxidation polymer of an aniline derivative, a dopant, and an organic solvent, which is valuable as an electrolyte of a battery, an electrolyte of a capacitor, or the like. Furthermore, the present invention relates to an electroconductive article valuable as an electric or electronic part of an electromagnetic wave shielding member, a solar cell, a junction element or an electrochromic element, and to a process for preparing this electroconductive article from the above-mentioned polymer solution.

2. Background Art

It is known that an electroconductive polymer is obtained by doping a dopant into a polymeric substance, and detailed research has been especially made into electroconductive polyacetylene and poly-p-phenylene. It is known that p-type and n-type electroconductive polymers are formed by doping $AsF_5$ or the like as the acceptor and sodium or the like as the donor into polyacetylene. Furthermore, it is known that electrical insulators, semiconductors, and electroconductive polymers having an electroconductivity comparable to those of metals can be obtained by selecting and using various dopants for polyphenylene sulfide, polythiophene, polypyrrole, and polyaniline, and it has been clarified that the electroconductivity in these polymers can be optionally controlled by varying the kinds and amounts of dopants.

It is therefore expected that these electroconductive polymers will be used for solar cells, electrodes, electrochromic elements, and the like.

Furthermore, since control by a computer has recently been conducted in automobiles, it is expected that these known electroconductive polymers will be widely used for shielding electromagnetic waves or other purposes, and it is also expected that they will be applied to various junction elements and other electronic instruments.

For some of these known electroconductive polymers, for example, polyacetylene, poly-p-phenylene, polythiophene, polypyrrole, and polyaniline, there are at present no solvents capable of dissolving both polymers per se and doped polymers. It is known that $AsF_3$ can be used as the solvent capable of dissolving both poly-p-phenylene sulfide and a doping product thereof (Japanese unexamined patent publication No. 59-11324), but $AsF_3$ has a high toxicity and the electroconductivity of the polymer solution is abruptly reduced in air. Accordingly, the product cannot be used as an electroconductive article.

As is apparent from the foregoing description, known electroconductive polymers, except certain electroconductive polymers, are generally insoluble and infusible, and therefore, the possibility of the production of an electroconductive article having an optional shape and thickness by dissolving or melting the known electroconductive polymer is limited and the use of the formed electroconductive article is naturally limited. This hinders development of the applications of electroconductive polymers, and the elimination of this defect is desired in various fields.

It is therefore a primary object of the present invention to overcome the above-mentioned defect and provide an electroconductive polymer solution which has a high electroconductivity, a good stability in air, and is very safe while in use. Another object of the present invention is to provide an electroconductive polymer article having an optional shape and thickness, a high electroconductivity, and an excellent stability in air.

DISCLOSURE OF THE INVENTION

In accordance with one aspect of the present invention, there is provided an electroconductive polymer solution comprising a polymer comprising at least 50 mole% of recurring units represented by the following general formula (1):

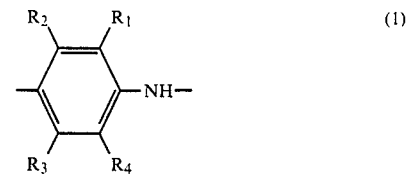

wherein $R_1$ through $R_4$, which may be the same or different, represent a hydrogen atom or an alkyl or alkoxy group having 1 to 5 carbon atoms, with the proviso that the case where all of $R_1$ through $R_4$ simultaneously represent a hydrogen atom is excluded, a dopant and an organic solvent.

In accordance with another aspect of the present invention, there is provided an electroconductive article comprising an oxidation polymer of an aniline derivative represented by the general formula (1) and a dopant.

In accordance with still another aspect of the present invention, there is provided a process for the preparation of an electroconductive article, which comprises shaping the above-mentioned electroconductive polymer solution and removing the organic solvent from the obtained shaped article.

BEST MODE FOR CARRYING OUT THE INVENTION

The oxidation polymer of an aniline derivative used in the present invention is an organic solvent-soluble polymer comprising at least 50 mole% of recurring units represented by the general formula (1). If the recurring units represented by the general formula (I) are less than 50 mole%, the electroconductivity is not satisfactory.

The above-mentioned oxidation polymer is obtained by polymerizing an aniline derivative represented by the general formula (2) given hereinafter. The polymer formed by this polymerization may comprise not only units having the 1,4-bond, which are represented by the general formula (1), but also units having the 1,3-bond and units having the 1,2-bond, which are represented by the following formulae, and units from which the substituents have been isolated by any side reaction:

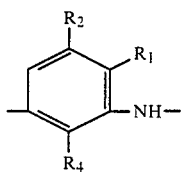

(1,3-bond)

and

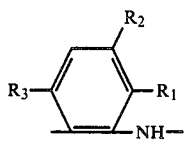

(1,2-bond)

The content of the units other than the units having the 1,4-bond, which are represented by the general formula (1), should be lower than 50 mole%. If the content of these units is too high, the electroconductivity of the polymer is insufficient.

The polymerization degree of the oxidation polymer is generally in the range of from 3 to 2,000.

The oxidation polymer of an aniline derivative used in the present invention is obtained by polymerizing an aniline derivative represented by the following formula (2):

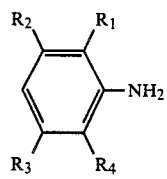

(2)

wherein $R_1$ through $R_4$ are as defined in the general formula (1).

Aniline derivatives represented by the general formula (2) may be used singly or in the form of mixtures of two or more thereof.

As specific examples of the aniline derivative having no substituent at the p-position, which is represented by the general formula (2), there can be mentioned 2-methoxyaniline, 3-methoxyaniline, 2,3-dimethoxyaniline, 2,5-dimethoxyaniline, 3,5-dimethoxyaniline, 2,6-dimethoxyaniline, 2-ethoxyaniline, 2-ethoxy-3-methoxyaniline, 3-ethoxyaniline, 2,3-diethoxyaniline, 2,5-diethoxyaniline, 2,6-diethoxyaniline, 3,5-diethoxyaniline, 2,6-diethoxyaniline, 2-methoxy-3-ethoxyaniline, 2-methoxy-5-ethoxyaniline, 2,3,6-trimethoxyaniline, 2,3,5-trimethoxyaniline, 2,3,5,6-tetramethoxyaniline, 2,3,5,6-tetraethoxyaniline, 2,3-dimethylaniline, 2-methyl-3-methoxyaniline, 2,3,5,6-tetramethylaniline, 2-methyl-5-methoxyaniline, and 3,5-dimethylaniline, although aniline derivatives that can be used in the present invention are not limited to those exemplified above. Among these aniline derivatives, those having at least 2 substituents are preferred, and alkoxyanilines having at least 2 alkoxy substituents are especially preferred because oxidation polymers of these alkoxyanilines have a good solubility in organic solvents and have a high electroconductivity.

The process for the preparation of the oxidation polymer of the aniline derivative is not particularly critical. As the oxidation polymer of the aniline derivative, there can be mentioned an oxidation polymer of an aniline derivative, a dopant-containing oxidation polymer obtained by doping a dopant in the formed oxidation polymer of the aniline derivative, and a dopant-containing oxidation polymer obtained by oxidation polymerization of an aniline derivative in the presence of a dopant.

Of these oxidation polymers, an oxidation polymer containing a dopant is preferred because a dopant need not be added when preparing the electroconductive polymer solution of the present invention. However, a dopant may be further added when preparing the electroconductive polymer solution according to the amount of the dopant contained in the oxidation polymer of the aniline derivative.

The dopant-doped oxidation polymer of the aniline derivative can be prepared by oxidation-polymerizing the aniline derivative electrochemically or chemically.

For the electrochemical polymerization, the aniline derivative is polymerized by anodic oxidation at a current density of about 0.01 to 50 mA/cm² under a voltage of 1 to 300 V. Any of the constant current method, the constant voltage method, and other methods can be adopted. The polymerization is carried out in an aqueous solution, an alcohol solvent or a mixture thereof, but preferably, the polymerization is carried out in an aqueous solution. The alcohol may dissolve or not dissolve the formed oxidation polymer. The kind of the alcohol is changed according to the kind of the aniline derivative. Ordinarily, methyl alcohol, ethyl alcohol, ethylene glycol, propyl alcohol, and butyl alcohol are used.

The pH value of the electrolyte is not particularly critical, but preferably the pH value is not larger than 3, especially not larger than 2. As the acid used for adjusting the pH value, there can be mentioned HCl, HBF$_4$, CF$_3$COOH, H$_2$SO$_4$, and HNO$_3$, although the acids that can be used are not limited to those mentioned above.

As the dopant used in electrochemically polymerizing the aniline derivative, there can be mentioned salts containing such groups as Cl$^-$, I$^-$, Br$^-$, F$^-$, BF$_4^-$, ClO$_4^-$, IO$_4^-$, AsF$_6^-$, SbF$_6^-$, PF$_6^-$, SiF$_4^-$, AsF$_6^-$, FSO$_4^-$, HSO$_4^-$, SO$_4^{2-}$, CF$_3$SO$_3^-$, CF$_3$COO$^-$, and NO$_3^-$. The oxidation polymer is obtained in the state containing the above-mentioned anion as a p-type dopant.

These salts contain as the cation alkali metal ions such as lithium, sodium and potassium ions and a quaternary ammonium ion.

The thus-obtained oxidation polymer generally contains the anion as the dopant in an amount of 10 to 90 mole% based on the monomer units.

According to the electrochemical process, the oxidation polymer is ordinarily precipitated as a black polymer on the anode. Accordingly, the anode is washed, the polymer is separated and dried, and is then dissolved in an organic solvent.

For the chemical polymerization, for example, the aniline derivative is oxidation-polymerized in an aqueous solution by an oxidative strong acid or a strong acid and a peroxide such as potassium persulfate. According to this process, the oxidation polymer is obtained in the powdery form. Accordingly, the powdery polymer is separated and dried, and is then used. Also in this case, the corresponding anion is doped in the obtained oxidation polymer. Ordinarily, the anion is contained as the dopant in the oxidation polymer in an amount of 10 to 90 mole% based on the monomer units. The separated and dried oxidation polymer of the aniline derivative is dissolved in an organic solvent capable of dissolving said polymer to form a polymer solution.

As the process for the preparation of the electroconductive polymer solution, there can be mentioned (i) a process in which an anion-doped oxidation polymer obtained by the electrochemical oxidation polymerization is dissolved in an organic solvent, (ii) a process in which an anion-doped oxidation polymer obtained by the chemical oxidation polymerization is dissolved in an organic solvent, (iii) a process in which a chemically synthesized oxidation polymer not doped with an anion is chemically or electrochemically doped with a dopant is then dissolved in an organic solvent, and (iv) a process in which a chemically synthesized oxidation polymer not doped with an anion is dissolved in an organic solvent and a dopant is added to the solution, although the processes that can be adopted are not limited to those mentioned above.

In the present invention, as the dopant, dopants as mentioned above are similarly used with respect to the oxidation polymerization of the aniline derivative.

The amount of the dopant incorporated is changed according to whether or not the oxidation polymer of the aniline derivative used contains the dopant in advance, and it cannot be simply determined. However, in general, the dopant is incorporated in such an amount that the ratio of the dopant in the oxidation polymer of the aniline derivative is 10 to 90 mole% based on the monomer units.

The kind of organic solvent used for dissolving the oxidation polymer of the aniline derivative is changed according to the kind of oxidation polymer of the aniline derivative used, and the solvent is not specified but any organic solvent capable of dissolving the oxidation polymer of the aniline derivative can be used. For example, there can be mentioned aliphatic and aromatic ketones, ethers, esters, amides, nitriles, carbonates, carboxylic acids, halogen compounds, sulforane compounds, nitro compounds, sulfoxides, lactams, lactones, and saturated and unsaturated heterocyclic compounds.

As the aliphatic and aromatic ketones, there can be mentioned acetone, diethyl ketone, methyl propyl ketone, hydroxyacetone, methoxyacetone, phenylacetone, and 4-phenylbutanone-2. As the ether, there can be mentioned tetrahydrofuran, dioxane, dimethyl ether, methyl ethyl ether, dimethoxyethane, diethoxymethane, metyl glycol, anisole, 1,2-dimethoxybenzene, 1,4-dimethoxybenzene, and 1,3-oxorane. As the ester, there can be mentioned methyl acetate, ethyl acetate, trimethyl orthoformate, ethyl oxalate, and trimethyl phosphate. As the amide, there can be mentioned formamide, N-methylformamide, dimethylformamide, N-methylacetamide, dimethylacetamide, N-methylpropioamide, and hexamethylphosphoramide. As the nitrile, there can be mentioned acetonitrile, valeronitrile, and benzonitrile. As the carbonate, there can be mentioned propylene carbonate, ethylene carbonate, and dimethyl carbonate. As the carboxylic acid, there can be mentioned formic acid, acetic acid, benzoic acid, and oxalic acid. As the halogen compound, there can be mentioned chloroform, carbon tetrachloride, chlorobenzene, dichlorobenzene, benzoyl chloride, benzoyl bromide, benzenesulfonyl chloride, benzenesulfony dichloride, benzenethiophosphonyl dichloride, methanesulfonyl chloride, acetyl chloride, dimethylsulfamyl chloride, ethyloxalyl chloride, and chlorosulfonylacetyl chloride. As the sulfolune compound, there can be mentioned sulfolune and 3-methyl sulfonane. As the nitro compound, there can be mentioned nitromethane and nitrobenzene. As the sulfoxide, there can be mentioned dimethylsulfoxide. As the lactam, there can be mentioned N-methylpyrrolidone, and as the lactone, there can be mentioned γ-butyrolactone. As the saturated and unsaturated heterocylic compounds, there can be mentioned tetrahydrothiophene, 3-methyl-2-oxazolidone, pyrrole, 1-methylpyrrole, 2,4-dimethylthiazole, and furan.

The concentration of the oxidation polymer of the aniline derivative in the polymer solution is not particularly critical, but the concentration is ordinarily 0.01 to 90% by weight.

The electric conductivity of the so-obtained electroconductive polymer solution varies according to the kind of the oxidation polymer used and the concentration of the oxidation polymer of the aniline derivative in the solution, but the electric conductivity is ordinarily in the range of from $10^{-5}$ to $10^{-1}$ S/cm.

Surfaces of various solids such as metals, semiconductors, synthetic resins, ceramics, papers, and fibers are covered with the above-mentioned electroconductive polymer solution by coating, spraying, deposition or the like, and the organic solvent is removed from the coverings, whereby electroconductive articles having electroconductive coverings formed on the foregoing solid articles can be prepared.

Furthermore, an electroconductive film having a desirable thickness can be obtained by casting the electroconductive polymer solution continuously or batchwise, followed by drying.

Moreover, an electroconductive fiber or film can be prepared by extruding the electroconductive polymer solution from a die.

Still further, the electroconductive polymer solution is cast in a mold having an optional shape and the organic solvent is removed from the electroconductive polymer solution in the mold, whereby an electroconductive article having a shape corresponding to the shape of the mold is prepared.

In the present invention, the term "electroconductive article" is used to indicate all of the foregoing articles, that is, an electroconductive article having an electroconductive covering formed on the surface of a solid article, an electroconductive film, an electroconductive fiber, a cast product and the like.

The method for removing the organic solvent is not particularly critical, but there may be adopted customary methods such as vacuum or reduced pressure deaeration, heat-drying, forced circulation, and air-drying.

The electric conductivity of the thus-obtained electroconductive covering, film, fiber or cast product is in the range of from $10^{-5}$ to $10^2$ S/cm.

The present invention will now be described in detail with reference to the following examples and comparative examples.

EXAMPLE 1

A glass reaction vessel was charged with 20 ml of an aqueous solution containing 1.5 moles of $HBF_4$ and 0.35 mole of 2,5-dimethoxyaniline to form an aqueous solution having a pH value smaller than 1.0. Two platinum electrodes, each having an electrode area of 10 cm², were inserted in the aqueous solution at a distance of 2 cm, and electrolytic oxidation polymerization was carreid out by supplying an electric current of 20 C between the electrodes. A black oxidation polymer was precipitated on the platinum electrodes as the anode. After termination of the electrolytic polymerization, the covered anode was washed with distilled water and dried in vacuo at 70° C. The polymer was then peeled from the platinum electrode. From the results of the elementary analysis it was found that, in the obtained polymer, $BF_4^-$ was doped in an amount of 0.45 mole per mole of 2,5-dimethoxyaniline. From the infrared spectrum and NMR analysis, it was found that the polymer contained at least 80 mole% of the recurring units represented by the general formula (1).

A part of the obtained polymer was dissolved in acetonitrile to form a polymer solution having a polymer concentration of 30% by weight. The electric conductivity of the obtained polymer solution was $5.2 \times 10^{-3}$ S/cm as measured at room temperature. When the obtained polymer solution was allowed to stand in air for 1 month and the electric conductivity was measured, it was found that the electric conductivity was $5.0 \times 10^{-3}$ S/cm, and that the electric conductivity was not substantially changed.

The remaining part of the polymer was dissolved in acetonitrile to form a polymer solution having a polymer concentration of 10% by weight. The obtained polymer solution was cast on a glass sheet and deaerated in vacuo to obtaine a cast film. The electric conductivity was $2.5 \times 10^{-1}$ S/cm as measured at room temperature (according to the direct current four-terminal method). When the film was allowed to stand in air for 1 month and the electric conductivity was measured again, it was found that the electric conductivity was $2.2 \times 10^{-1}$ S/cm and thus the electric conductivity was not substantially changed.

EXAMPLES 2 through 4

The electrolytic polymerization was carried out in the same manner as described in Example 1 except that an aniline derivative shown in Table 1 was used as the aniline derivative instead of 2,5-dimethoxyaniline used in Example 1, and a polymer solution having a polymer concentration of 30% by weight was prepared. The physical properties of the obtained polymer solution are shown in table 1.

From the infrared spectrum and NMR analysis, it was found that each polymer contained at least 80 mole% of the recurring units represented by the general formula (1).

Separately, a polymer solution having a polymer concentration of 10% by weight was prepared and a cast film was prepared from the solution. The physical properties of the obtained case film are shown in Table 1.

EXAMPLE 5

Chemical Synthesis of Poly-2,5-Dimethoxyaniline

1. Purification of Monomer

Zn powder was added to the monomer under Ar stream and the monomer was recrystallized from ethanol.

2. Polymerization

A four-neck 1-liter flask equipped with a thermometer, a stirrer, and a condenser was charged with 500 ml of a 1N aqueous of $HBF_4$ and the solution was ice-cooled to 22° C.

Then, 33.62 g of 2,5-dimethoxyaniline (0.2195 mole) was dissolved in the solution.

Then, 11.5 g of ammonium persulfate (0.05 mole) was added in the solid state to the solution with stirring, and within 2 minutes after the addition, the solution was colored blue and a precipitate of a dense blue color was formed. Since this reaction was an exothermic reaction, the reaction liquid was maintained at 22° C. during the reaction.

After the reaction had been conducted for 1 hour, the reaction liquid was filtered and the residue was washed with 250 ml of an aqueous solution containing 42% of $HBF_4$ for 10 minutes under atmospheric pressure, and filtered under a reduced pressure. The filtration residue was filtered with 500 ml of distilled water for 10 minutes under a highly reduced pressure.

From the elementary analysis and IR measurement of the product, it was confirmed that the product had the same composition and structure as those of the poly-2,5-dimethoxyaniline obtained by the electrolytic polymerization in Example 1.

From the results of the elementary analysis it was found that, in this oxidation polymer, $BF_4^-$ was doped in an amount of 0.49 mole per mole of 2,5-dimethoxyaniline.

By using the oxidation polymer obtained according to the above-mentioned polymer, a polymer solution having a concentration of 30% was prepared in the same manner as described in Example 1. The electric conductivity of the polymer solution was $4.7 \times 10^{-3}$ S/cm. When the obtained film was allowed to stand in air for 1 month and the electric conductivity was measured again, it was found that the electric conductivity was $4.6 \times 10^{-3}$ S/cm.

Separately, by using the oxidation polymer obtained according to the above-mentioned polymer, a polymer

TABLE 1

| Example No. | Aniline derivative | Amount (mole %) of doped $BF_4^-$ | Electric conductivity (S/cm) of 30% polymer solution | | Electric conductivity (S/cm) of cast film | |
|---|---|---|---|---|---|---|
| | | | Just after preparation | After standing 1 month in air | Just after preparation | After standing 1 month in air |
| 2 | 2,3,6-trimethoxy-aniline | 52 | $7.7 \times 10^{-3}$ | $7.6 \times 10^{-3}$ | 5.4 | 4.8 |
| 3 | 2,6-di-ethoxy-aniline | 39 | $2.9 \times 10^{-2}$ | $3.0 \times 10^{-2}$ | $7.5 \times 10^{-2}$ | $6.2 \times 10^{-2}$ |
| 4 | 2-ethoxy-3-methoxy-aniline | 44 | $8.6 \times 10^{-2}$ | $8.7 \times 10^{-2}$ | $6.9 \times 10^{-1}$ | $6.1 \times 10^{-1}$ |

COMPARATIVE EXAMPLE

The electrolytic polymerization was carried out in the same manner as described in Example 1 except that aniline was used instead of 2,5-dimethoxyaniline. The obtained polymer of aniline was insoluble in organic solvent.

solution having a concentration of 10% was prepared in the same manner as described in Example 1, and a cast film was prepared from this solution. The electric conductivity of the cast film was $1.9 \times 10^{-1}$ S/cm. When the obtained film was allowed to stand in air for 1 month and the electric conductivity was measured again, it was found that the electric conductivity was $1.8 \times 10^{-1}$ S/cm.

EXAMPLES 6 through 8

The electrolytic polymerization was carried out in the same manner as described in Example 1 except that an acid shown in Table 2 was used instead of $HBF_4$ used in Example 1. The obtained polymer contained at least 80 mole% of the recurring units represented by the general formula (1).

An acetonitrile solution having a polymer concentration of 30% by weight was prepared in the same manner as described in Example 1. The physical properties of the polymer solution are shown in Table 2.

Separately, an acetonitrile solution having a polymer concentration of 10% by weight was prepared in the same manner as described in Example 1, and a cast film was prepared from this solution. The physical properties of the obtained cast film are shown in Table 2.

TABLE 2

| Example No. | Acid | Amount (mole %) of doped $BF_4^-$ | Electric conductivity (S/cm) of 30% polymer solution | | Electric conductivity (S/cm) of cast film | |
|---|---|---|---|---|---|---|
| | | | Just after preparation | After standing 1 month in air | Just after preparation | After standing 1 month in air |
| 6 | HCl | 48 | $6.8 \times 10^{-3}$ | $6.3 \times 10^{-3}$ | $3.4 \times 10^{-1}$ | $1.2 \times 10^{-1}$ |
| 7 | $HClO_4$ | 47 | $3.2 \times 10^{-3}$ | $3.0 \times 10^{-3}$ | $1.5 \times 10^{-1}$ | $1.4 \times 10^{-1}$ |
| 8 | $H_2SO_4$ | 35 | $4.8 \times 10^{-4}$ | $4.3 \times 10^{-4}$ | $7.8 \times 10^{-2}$ | $7.5 \times 10^{-2}$ |

EXAMPLE 9

In the same manner as described in Examples 6 through 8, an acetonitrile solution containing 10% by weight of an oxidation polymer of 2,5-dimethoxyaniline was prepared, and the solution was coated on a commercially available Teflon tape (having a thickness of 100 $\mu$m) and deaerated in vacuo to obtain an electroconductive Teflon tape having an excellent mechanical strength. The electric conductivity of this tape was $2.8 \times 10^{-2}$ S/cm. After standing for 1 month in air, the electric conductivity of the tape was $1.8 \times 10^{-2}$ S/cm.

CAPABILITY OF EXPLOITATION IN INDUSTRY

The electroconductive polymer solution of the present invention is non-toxic and has an excellent stability in air, and a high electric conductivity. Accordingly, the electroconductive polymer solution of the present invention is valuable as an electrolyte of a battery, an electrolyte of a capacitor, and the like.

Furthermore, the electroconductive polymer solution of the present invention can be easily formed into an electroconductive article having an optional shape, and the obtained electroconductive article is stable in air and has a high electric conductivity. Accordingly, the electroconductive polymer solution can be valuably used for fabrication of electronic parts such as an electromagnetic wave shielding member, a solar cell, a junction element, an electrochromic element, and the like.

We claim:

1. An electroconductive polymer solution comprising a polymer comprising at least 50 mole% of recurring units represented by the following general formula (1):

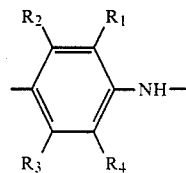
(1)

wherein $R_1$ through $R_4$, which may be the same or different, represent a hydrogen atom or an alkyl or alkoxy group having 1 to 5 carbon atoms, with the proviso that at least two of $R_1$ through $R_4$ are an alkyl or alkoxy group having 1 to 5 carbon atoms, a dopant and an organic solvent.

2. An electroconductive polymer solution as set forth in claim 1, wherein the amount of the dopant is 10 to 90 mole% based on the recurring units of the polymer.

3. An electroconductive polymer solution as set forth in claim 1, wherein the polymer concentration in the solution is 0.01 to 90% by weight.

4. An electroconductive polymer solution as set forth in claim 1, wherein the polymer is an oxidation polymer of an aniline derivative represented by the following general formula (2):

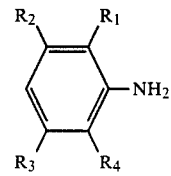
(2)

wherein $R_1$ through $R_4$ are as defined in the general formula (1).

5. An electroconductive polymer solution as set forth in claim 4, wherein the oxidation polymer of the aniline derivative is an organic solvent-soluble dopant-containing oxidation polymer prepared by the electrochemical oxidation polymerization process.

6. An electroconductive polymer solution as set forth in claim 4, wherein the oxidation polymer of the aniline derivative is an organic solvent-soluble dopant-containing polymer prepared by the chemical oxidation polymerization process using an oxidative strong acid or a combination of an oxidative strong acid and a peroxide.

7. An electroconductive polymer solution as set forth in claim 1, wherein the dopant is at least one electron-accepting dopant selected from the group consisting of $Cl^-$, $I^-$, $Br^-$, $F^-$, $BF_4^-$, $ClO_4^-$, $IO_4^-$, $SbF_6^-$, $PF_6^-$, $SiF_4^-$, $AsF_6^-$, $HSO_4^-$, $FSO_4^-$, $SO_4^{2-}$, $CF_3SO_3^-$, $CF_3COO^-$ and $NO_3^-$.

8. An electroconductive polymer solution as set forth in claim 1, wherein the organic solvent is an aliphatic or aromatic ketone, an ether, an ester, an amide, a nitrile, a carbonate, a carboxylic acid, a halide, a sulforane compound, a nitro compound, a sulfoxide, a lactam, a lactone, a saturated or unsaturated heterocyclic compound or a mixture of two or more of said compounds.

9. An electroconductive article comprising a polymer comprising at least 50 mole% of recurring units represented by the following general formula (1):

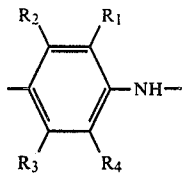

(1)

wherein $R_1$ through $R_4$, which may be the same or different, represent a hydrogen atom or an alkyl or alkoxy group having 1 to 5 carbon atoms, with the proviso that at least two of $R_1$ through $R_4$ are an alkyl or alkoxy group having 1 to 5 carbon atoms, and a dopant.

10. An electroconductive article as set forth in claim 9, wherein the amount of the dopant is 10 to 90 mole% based on the recurring units of the polymer.

11. An electroconductive article as set forth in claim 9, wherein the polymer is an oxidation polymer of an aniline derivative represented by the following general formula (2):

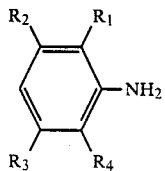

(2)

wherein $R_1$ through $R_4$ are as defined in the general formula (1).

12. An electroconductive article as set forth in claim 9, wherein the dopant is at least one electron-accepting dopant selected from the group consisting of $Cl^-$, $I^-$, $Br^-$, $F^-$, $BF_4^-$, $ClO_4^-$, $I_4^-$, $SbF_6^-$, $PF_6^-$, $SiF_4^-$, $AsF_6^-$, $HSO_4^-$, $FSO_4^-$, $SO_4^{2-}$, $CF_3SO_3^-$, $CF_3COO^-$ and $NO_3^-$.

13. An electroconductive article as set forth in claim 9, which is in the form of a film.

14. A process for the preparation of an electroconductive article, which comprises forming an article from an electroconductive polymer solution comprising a polymer comprising at least 50 mole% of recurring units represented by the following general formula (1):

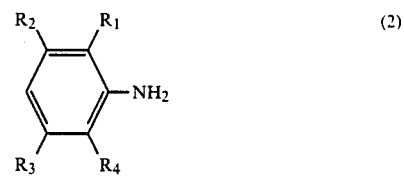

(1)

wherein $R_1$ through $R_4$, which may be the same or different, represent a hydrogen atom or an alkyl or alkoxy group having 1 to 5 carbon atoms, with the proviso that at least two of $R_1$ through $R_4$ are an alkyl or alkoxy group having 1 to 5 carbon atoms, a dopant and an organic solvent, and removing the organic solvent from the formed article.

15. A process according to claim 14, wherein the amount of the dopant in the electroconductive polymer solution is 10 to 90 mole% based on the recurring units of the polymer.

16. A process according to claim 14, wherein the polymer concentration in the electroconductive polymer solution is 0.01 to 90% by weight.

17. A process according to claim 14, wherein the polymer is an oxidation polymer of an aniline derivative represented by the following general formula (2):

$$\underset{R_3\quad R_4}{\overset{R_2\quad R_1}{\text{—NH}_2}}$$ (2)

wherein $R_1$ through $R_4$ are as defined in the general formula (1).

18. A process according to claim 17, wherein the oxidation polymer of the aniline derivative is an organic solvent-soluble dopant-containing oxidation polymer obtained by the electrochemical oxidation polymerization process.

19. A process according to claim 17, wherein the oxidation polymer of the aniline derivative is an organic solvent-soluble dopant-containing oxidation polymer obtained by the chemical oxidation process using an oxidative strong acid or a combination of an oxidative strong acid and a peroxide.

20. A process according to claim 14, wherein the dopant is at least one electron-accepting dopant selected from the group consisting of $Cl^-$, $I^-$, $Br^-$, $F^-$, $BF_4^-$, $ClO_4^-$, $IO_4^-$, $SbF_6^-$, $PF_6^-$, $SiF_4^-$, $AsF_6^-$, $HSO_4^-$, $FSO_4^-$, $SO_4^{2-}$, $CF_3SO_3^-$, $CF_3COO^-$ and $NO_3^-$.

21. A process according to claim 14, wherein the organic solvent is an aliphatic or aromatic ketone, an ether, an ester, an amide, a nitrile, a carbonate, a carboxylic acid, a halide, a sulfolane compound, a nitro compound, a sulfoxide, a lactam, a lactone, a saturated or unsaturated heterocyclic compound or a mixture of two or more of said compounds.

22. A process according to claim 14, wherein the organic solvent is removed by deaeration under reduced pressure, heat-drying, forced air circulation or air-drying.

* * * * *